(12) United States Patent
Qureshi et al.

(10) Patent No.: US 9,916,233 B1
(45) Date of Patent: Mar. 13, 2018

(54) USING CONTAINERS FOR UPDATE DEPLOYMENT

(71) Applicant: Amazon Technologies, Inc., Seattle, WA (US)

(72) Inventors: Tipu Saleem Qureshi, Seattle, WA (US); Deepak Singh, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/671,996

(22) Filed: Mar. 27, 2015

(51) Int. Cl.
*G06F 9/44* (2006.01)
*G06F 11/36* (2006.01)
*G06F 9/445* (2018.01)

(52) U.S. Cl.
CPC ............ *G06F 11/3692* (2013.01); *G06F 8/65* (2013.01); *G06F 8/70* (2013.01); *G06F 11/3688* (2013.01)

(58) Field of Classification Search
CPC ............................... G06F 11/3692; G06F 8/65
USPC ......................................................... 717/124
See application file for complete search history.

(56) References Cited

U.S. PATENT DOCUMENTS

| 7,096,464 | B1 * | 8/2006 | Weinmann | ................ G06F 8/65 717/168 |
| 7,805,706 | B1 | 9/2010 | Ly | |
| 8,407,696 | B2 * | 3/2013 | Alpern | ..................... G06F 8/65 717/168 |
| 8,621,069 | B1 | 12/2013 | Tompkins | |
| 8,788,855 | B2 | 7/2014 | Cong | |
| 2004/0040025 | A1 | 2/2004 | Lehtinen | |
| 2006/0136928 | A1 | 6/2006 | Crawford, Jr. | |
| 2007/0118657 | A1 | 5/2007 | Kreitzer | |
| 2010/0070961 | A1 * | 3/2010 | Auer | ........................ G06F 8/65 717/168 |
| 2011/0154109 | A1 * | 6/2011 | Levine | ..................... G06F 8/70 714/26 |

(Continued)

FOREIGN PATENT DOCUMENTS

WO WO2014047073 3/2014

OTHER PUBLICATIONS

"Docker (Software)," Wikipedia, The Free Encyclopedia, Jul. 21, 2016, <http://en.wikipedia.org/wiki/Docker_(software)> [retrieved Jul. 29, 2016], 1 page.

(Continued)

*Primary Examiner* — Wei Zhen
*Assistant Examiner* — Lanny Ung
(74) *Attorney, Agent, or Firm* — Davis Wright Tremaine LLP

(57) ABSTRACT

A system and method for software deployment, where the system and method include, at a deployment service, obtaining a software package and determining that a client device is ready to receive at least a portion of the software package. If the client device is ready, providing at least the portion of the software package to the client device, launching at least the provided portion of the software package as set of instructions executing in a test container, and performing a set of tests on the executing set of instructions in the test container. Based at least in part on results of performing the set of tests, determining whether to cause at least the provided portion of the software package to execute in an active container on the client device.

22 Claims, 9 Drawing Sheets

(56) References Cited

U.S. PATENT DOCUMENTS

| | | | | |
|---|---|---|---|---|
| 2012/0124003 | A1* | 5/2012 | Sreedharan | G06F 11/1446 707/654 |
| 2013/0191527 | A1 | 7/2013 | Ashok et al. | |
| 2013/0198764 | A1* | 8/2013 | Kacin | G06F 9/45537 719/328 |
| 2013/0297964 | A1 | 11/2013 | Hedgal et al. | |
| 2014/0149986 | A1 | 5/2014 | Prakash et al. | |

OTHER PUBLICATIONS

"LXC," Wikipedia, The Free Encyclopedia, Jul. 6, 2016, <http://en.wikipedia.org/wiki/LXC> [retrieved Jul. 29, 2006], 1 page.

Soltesz, S., et al., "Container-Based Operating System Virtualization: A Scalable, High-Performance Alternative to Hypervisors," Proceedings of the 2nd ACM SIGOPS/EuroSys European Conference on Computer Systems, Mar. 21-23, 2007, Lisbon, Portugal, ACM SIGOPS Operating Systems Review 41(3):275-287.

Xavier, M.G., et al., "Performance Evaluation of Container-Based Virtualization for High Performance Computing Environments," 2013 21st Euromicro International Conference on Parallel, Distributed, and Network-Based Processing, Feb. 2013, pp. 233-240.

Zhao, M., and R.J. Figueiredo, "Experimental Study of Virtual Machine Migration in Support of Reservation of Cluster Resources," In Proceedings of the 2nd International Workshop on Virtualization Technology in Distributed Computing, Nov. 12, 2007, Reno, Nevada, pp. 1-8.

He et al., "Elastic Application Container: A Lightweight Approach for Cloud Resource Provisioning," IEEE 26th International Conference on Advanced Information Networking and Applications, Mar. 26, 2012, pp. 15-22, EX032169603, ISBN: 978-1-4673-0714-7.

International Search Report and Written Opinion dated Feb. 4, 2016, International Patent Application No. PCT/US2015/059983, filed Nov. 10, 2015.

Van et al., "SLA-aware Virtual Resource Management for Cloud Infrastructures," IEEE Ninth International Conference on Computer and Information Technology, Oct. 11, 2009, pp. 357-362, XP031563843, ISBN: 978-0-7695-3836-5.

* cited by examiner

USING CONTAINERS FOR UPDATE DEPLOYMENT

BACKGROUND

Modern computing systems are comprised of a combination of hardware and software, and software providers commonly issue new releases of such software as they find and fix software errors as features of the software are added or removed. Testing the new software releases prior to implementation is critical to ensure that no new problems are introduced to customers; however, it is often difficult to replicate the same usage patterns and hardware, software, and environmental conditions of the live environment within the testing environment. Furthermore, deploying new software releases often require downloading and/or installing an entire software package, even when only minor changes have been made to the software or when the particular device may already have most of the software of the software package already stored on the device. Additionally, even after testing has been performed, when the new software is released to the live environment, there may be a significant period of downtime where affected users and computer systems are unable to perform important tasks while the new releases are being installed and configured within the live environment.

BRIEF DESCRIPTION OF THE DRAWINGS

Various embodiments in accordance with the present disclosure will be described with reference to the drawings, in which.

DETAILED DESCRIPTION

Figure 1:
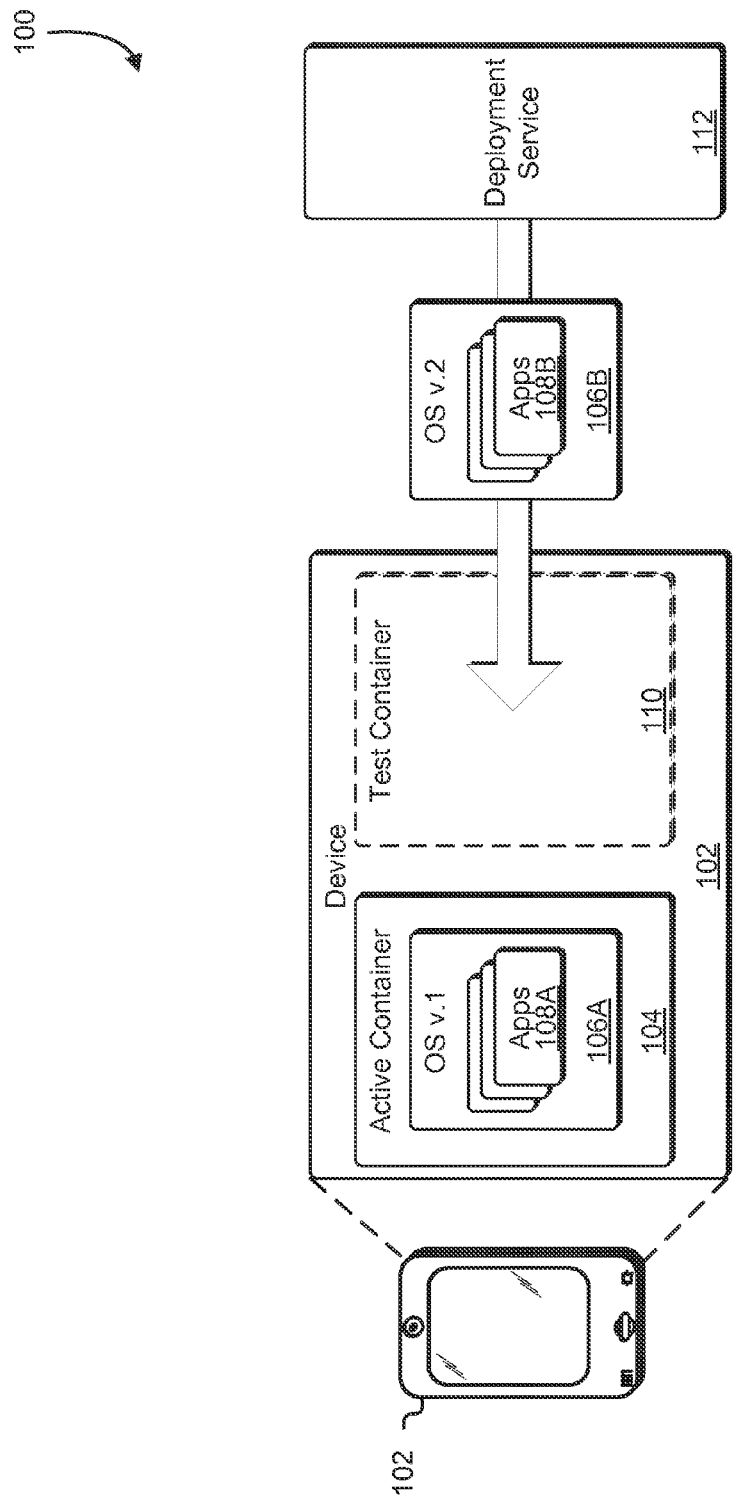
FIG. 1 illustrates an example of a device with containers in communication with a deployment service in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include a system and method for deploying and testing software packages in software containers on client devices, such as mobile telephones, e-readers, tablet computers, laptop computers, and other computing devices. The system and method include obtaining, at a computing system of a deployment service, a software package comprising a set of computer-executable instructions that have been configured by a software provider to launch and execute within a software container. The deployment service may have a record of client devices that are compatible with the software package, or may have another method of determining to which client devices the software package should be deployed. The deployment service may also have information about the client devices indicating the hardware and indicating which versions of which software may already be installed on a client device. Based at least in part on this information, the deployment service may determine whether the client device has sufficient resources to support installing and/or testing the software package on the client device. Furthermore, based at least in part on this information, the deployment service may also determine which software libraries and other files actually need to be provided to the client device and which software libraries and other files need not be provided because they are already resident on the client device. Note that in some implementations, the deployment service may not make this determination, but rather may provide a list of library files and their versions, and the client device may determine and respond to the deployment service with a list of the library files that it actually needs.

The client device may include hardware and software that supports containerization, and may be configured to have an active software container and at least one background software container. Each software container may have its own separate, isolated user space, but each container may be configured to share resources (such as persistent storage) with another software container as needed. Each software container may be allocated a fixed amount or share of one or more resources, such as processing capability, memory, or storage. The active software container may include the active user space and include the "live" applications usable by the user of the client device. Background containers may contain applications that are actively running or may be idle, but unless made "active," may not be accessible to the user of the device, and the user of the device may not even be aware of the existence of the background container. In some cases, when software is installed to a container, if the software includes certain dependencies, such as specified versions of libraries, that are not present in the software container or within the software package but may be found within another container on the client device or elsewhere on the client device, a container encapsulation engine or a deployment agent running on the client device may retrieve, copy, or share the needed dependency from its current location to complete the software installation in the software container.

The deployment service may poll or query the client devices to determine whether they are ready to receive the software package. When a client device indicates that it is ready to receive the software package, the deployment service may provide the software package to the client device according to a schedule negotiated with the client device. In some cases, the software package may be received by the client device and installed into a background software container running in parallel with the current active software container on the device, which may be utilized as a test container for the software prior to the software being made live. Installing and testing of the software into the background container may be managed by a deployment agent running on the client device.

If the client device has sufficient resources to test the software in the background container, the deployment agent may cause various tests to be performed on the software. In some situations, the client device may be unable to perform some or all tests on the software; for example, performing some tests, due to the hardware and/or software capabilities of the client device, may unacceptably degrade the performance of the client device for the user during the testing. In such cases, testing may be performed in a test container at a testing framework of the deployment service configured to replicate the conditions and capabilities of the client device. In either case, the results of testing may be logged by the testing framework and used in determining whether testing was successful and whether the software should be made live. In some examples, "live" may refer to a stage in software development where the software has completed testing and is launched and made available to users. Thus, the "live environment" may refer to applications executing in a user space available to the user. In some examples, a "test environment" may refer to applications executing in a user space intended for testing the software prior to the software being transitioned to the live environment. Applications being tested may be complete and testing is being performed to confirm that the software is stable and performs as intended. Another stage may be a "development" stage, and software in a "development environment" may be incomplete and/or otherwise still be in the process of being developed and may not yet be ready to be tested in the test environment.

If the software is determined not to be made live, the test container may be deprovisioned as needed. Otherwise, if the software is determined to me made live, the deployment agent may cause the background container to be switched to be a new active container, and the previously active container may be switched to be a background container. The previously active container may then be deprovisioned as needed or may be retained for a time in case the new active container exhibits a problem and deployment needs to be rolled back. In some cases, the user may be allowed to select between one or more containers on the device as the active container.

The described and suggested techniques improve the field of computing, and specifically the field of software deployment, by, for a computing device targeted to receive a software update, taking advantage of unused or idle resources on the computing device to perform testing of the software update on the computing device in order to closely replicate how the software update will actually perform when made live. Additionally, the described and suggested techniques improve the functioning of computer systems by reducing the resources required to deploy the software update by installing only those portions of the software update not already resident on the computing systems. Moreover, the described and suggested techniques offer meaningful advantages over general software update schemes by reducing the period of downtime required to transition the software update into the live environment.

FIG. 1 illustrates an aspect of an environment 100 in which an embodiment may be practiced. As illustrated in FIG. 1, the environment 100 may include a device 102 having an active container 104 running a first operating system 106A and set of applications 108A in the foreground. The device 102 may also have resources available for one or more test containers, such as the test container 110, which may receive a second operating system 106B and/or set of applications 108B from a deployment service 112.

The device 102, in some embodiments, is embodied as a physical device and may be capable to send and/or receive requests, messages, or information over an appropriate network. Examples of such devices include personal computers, cellular telephones, handheld messaging devices, laptop computers, tablet computing devices, set-top boxes, personal data assistants, embedded computer systems, electronic book readers, and the like, such as the electronic client device 902 described in conjunction with FIG. 9. Components used for such a device can depend at least in part upon the type of network and/or environment selected. Protocols and components for communicating via such a network are well known and will not be discussed in detail. Communication over the network can be enabled by wired or wireless connections and combinations thereof.

The device 102 may be configured to support containerization; that is, the execution of applications and/or operating systems inside software containers. A container (also referred to as a software container or isolated user space instance) may be a lightweight operating system-level virtualization environment/instance running under a computer system instance that includes programs, data, and system libraries. When the software container is run, the running programs/processes in the software container may be isolated from other processes running on the same computer system. Thus, the active container 104 and the test container 110 may each run under a container encapsulation system. In some examples, a container encapsulation system may allow one or more containers to run within a single operating instance without the overhead associated with starting and maintaining virtual machines for running separate user space instances. In some examples, "user space" may refer to memory logically separated and allocated to a set of applications such that processes executing one user space cannot, unless explicitly allowed, access memory of applications executing in another user space, and vice versa. An example of a container encapsulation system is the Docker container engine. Operating systems 106A-06B of the software container instances 104 and 110, respectively, may execute in isolation from each other (e.g., each container may have in isolated view of the file system of its respective the operating system). Each of the software containers 104 and 110 may have their own namespace, and applications running within the software containers 104 and 110 may be isolated by only having access to resources available within the software container namespace. Thus, the software containers 104 and 110 may be an effective way to run one or more single applications within their own namespace.

The active container 104 (i.e., the foreground container) may be a container holding an operating system and applications currently in use by a user of the device 102. That is, when the user uses the device 102 and chooses to execute an application, said application may be running under the first operating system 106A and selected from one of the set of applications 108A. Conversely, the test container 110 may be a container executing in the background. In some cases, the test container 110 may be executing in the background of the device 102 such that the user is not provided any indication that the test container 110 is executing on the device 102. In some embodiments, there may be multiple test containers on the device, with each test container executing a different operating system and/or set of applications. The test container 110 may be configured to receive software, such as updates to the version(s) of software currently installed in the active container 104, from the deployment service 112. Such software or software updates may be a set of files created by a provider of software for the device 102 and may be provided to the deployment service 112 for deployment to the device 102.

The test container may be further configured to perform tests on the received software, such as executing a script to determine whether the received software has any software errors or defects or has any issues (e.g., compatibility) with the device 102. For example, such testing may evaluate whether the received software executes within the test container 110, responds correctly to various inputs, performs its functions within an acceptable time, is stable, and achieves the intended results. Test results may be uploaded to the deployment service 112 for further analysis. In some embodiments, use of resources (e.g., processor, memory, persistent storage, etc.) by an active user space, such as the user space of the active container 104, may take priority over testing that involves those resources, such that testing that involves those resources may be delayed until the device 102 is idle (e.g., no user input for 15 minutes, processor usage drops below 20%, available memory exceeds 75% of total, etc.) or until such resource is no longer in active use by another user space. In some cases, if, after a predetermined interval, testing is unable to be performed because resources needed for testing are in use, a testing framework of the deployment service 112 may be utilized to perform testing, as described in the present disclosure, in lieu of performing testing on the device itself.

The first operating system 106A may be an operating system, such as Linux, Microsoft Windows, or Google Android, configured to run on the device 102. The set of applications 108A may similarly be one or more applications configured to run under the environment of the first operating system. Such set of applications 108A may include applications such as e-mail clients, word processing applications, Internet browsers, and multimedia applications.

Likewise, the second operating system 106B may be the same as or different from the first operating system 106A. For example, the second operating system 106B may include an update (e.g., patch, new version, etc.) to the first operating system 106A. Alternatively, the second operating system 106B may be a completely different operating system than the first operating system 106A; for example, the first operating system 106A may be a Linux operating system, while the second operating system 106B may be a Microsoft Window operating system. Similarly, the set of applications 108B may be the same as or different from the set of applications 108A. As an example, the second operating system 106B may be the same as the first operating system 106A, however one or more of the set of applications 108B may be different from the set of applications 108A (e.g., new application version, one or more additional applications, one or more application removed, etc.). The second operating system 106B and applications 108B may be received from the deployment service 112 in a manner that minimizes impact to the user of the device 102. For example, the deployment service 112 may notify the device 102 that an update is available.

The device 102 may respond to the deployment service 112 when it is ready to receive the software update (e.g., when the device is not actively in use by the user; idle). If the device 102 does not indicate that it is ready to receive the software update, the deployment service 112 may wait for a certain interval and query the device 102 again whether it is now ready to receive the software update. Not only may the deployment service 112 query whether the device 102 is ready to receive the update, the deployment service 112 may also query whether the device 102 has sufficient resources (e.g., storage space, network bandwidth, specified processing capacity, sufficient available memory, etc.) to receive the software update. If the device 102 indicates that it has insufficient resources to receive the update, the deployment service 112 may delay providing the software update to the device 102 until such time as the device 102 indicates that it has sufficient resources available (e.g., deleted/uninstalled unused files to free up storage space, upgraded memory, etc.).

When the device 102 indicates to the deployment service 112 that it is ready to receive the software update, the deployment service 112 may provide the software update, such as through the Internet, WiFi, or other network connection, to the device. In some implementations, the device 102 may be configured with a preference to receive software updates during times when the device 102 is not being actively used by a user of the device. In such implementations, should the user attempt to use the device 102 while the device is in the midst of receiving a software update, the device 102 may notify the deployment service 112 to suspend transmission of the software update until such time that the device 102 notifies the deployment service 112 that it is once again ready to receive the software update. In some cases, receipt of the software update may require consent by the owner of the device 102, and consent may be granted through an interface, such as a confirmation dialog, on the device 102.

If the second operating system 106B and applications 108B are determined to be fully compatible (e.g., based at least in part on the results of testing the software update) and ready for use by the user of the device 102, the device 102 may be instructed to change the status of the test container 110 to be the active container. Similarly, the active container 104 may be rendered inactive. In some embodiments, the inactivated active container 104 may be retained for a period of time in case the inactivated active container 104 needs to be made active again (e.g., if the second operating system 106B and/or applications 108B are later found to have defects or other issues). In this manner, software updates may be provided to the device 102 with little impact on the user of the device 102.

The deployment service 112 may be a service provided by a computing resource service provider for deploying software updates to computing devices, such as the device 102. For example, a provider of cellular telephone software may be a customer of the computing resource service provider and may its upload software updates to the deployment service 112, such as through an interface (e.g., application programming interface) made available to the customer by the computing resource service provider. The software updates may be encapsulated as a containerized set of computer-executable instructions (also referred to as a "software package"), which may represent an entire copy of the particular state of the software container at the time the software package was generated. The software package may be configured to launch and execute as a software container after the software package obtained by the device (e.g. after the software package is provided to the test container 110 of the device 102 by the deployment service 112).

The deployment service 112 may have information that identifies appropriate devices, such as the device 102, for which the uploaded software updates are intended (e.g., records of media access control addresses of devices having older versions of the software). In some cases, the device 102 may be configured to, once it has power and a network connection sufficient to communicate with the deployment service, identify itself to the deployment service 112 through the network connection. The device 102 may report its hardware configuration and/or software (e.g., libraries, drivers, etc.) and software versions that are installed on the device 102 to the deployment service 112. The deployment service 112 may store this information in a data store for reference in future determinations whether the device 102 is in need of a software update or not. In some implementations, a manufacturer or vendor of the device 102 may provide this information to the deployment service 112. Similarly, this information may be updated as software updates are installed or rolled back on the device 102. Based at least in part on information about the hardware and currently installed software on the device, the deployment service 112 consequently may determine, for each such device, whether the device is capable of supporting a test container, and, if so, pushing the received software update to the test container 110. That is, the deployment service 112 may schedule with the device 102 how and when to provide the software update to the test container 110 on the device 102. For example, the software update may be scheduled to be provided immediately to the device 102, may be scheduled to be provided to the device 102 at a specified date/time, or may be scheduled to be provided to the device 102 when the device 102 indicates that certain conditions have been met (e.g., device has been idle for 30 minutes). As another example, the software update may be provided to the device 102 in multiple portions, and the deployment service 112 may be scheduled to provide each portion to the device 102 in a certain order or at certain times. Once the software updates are launched in the test container 110, such software updates may undergo testing or may be made active as needed.

The active container 104 and the test container 110 may be launched to have only specified resources from resources allocated to the respective container instance; that is, a container may be launched with a specified allocation of memory and may be specified to not utilize more than a certain amount of processing power. As noted, multiple containers may run simultaneously on a single device, and the resources of the device can thus be distributed between the software containers as needed.

Figure 2:
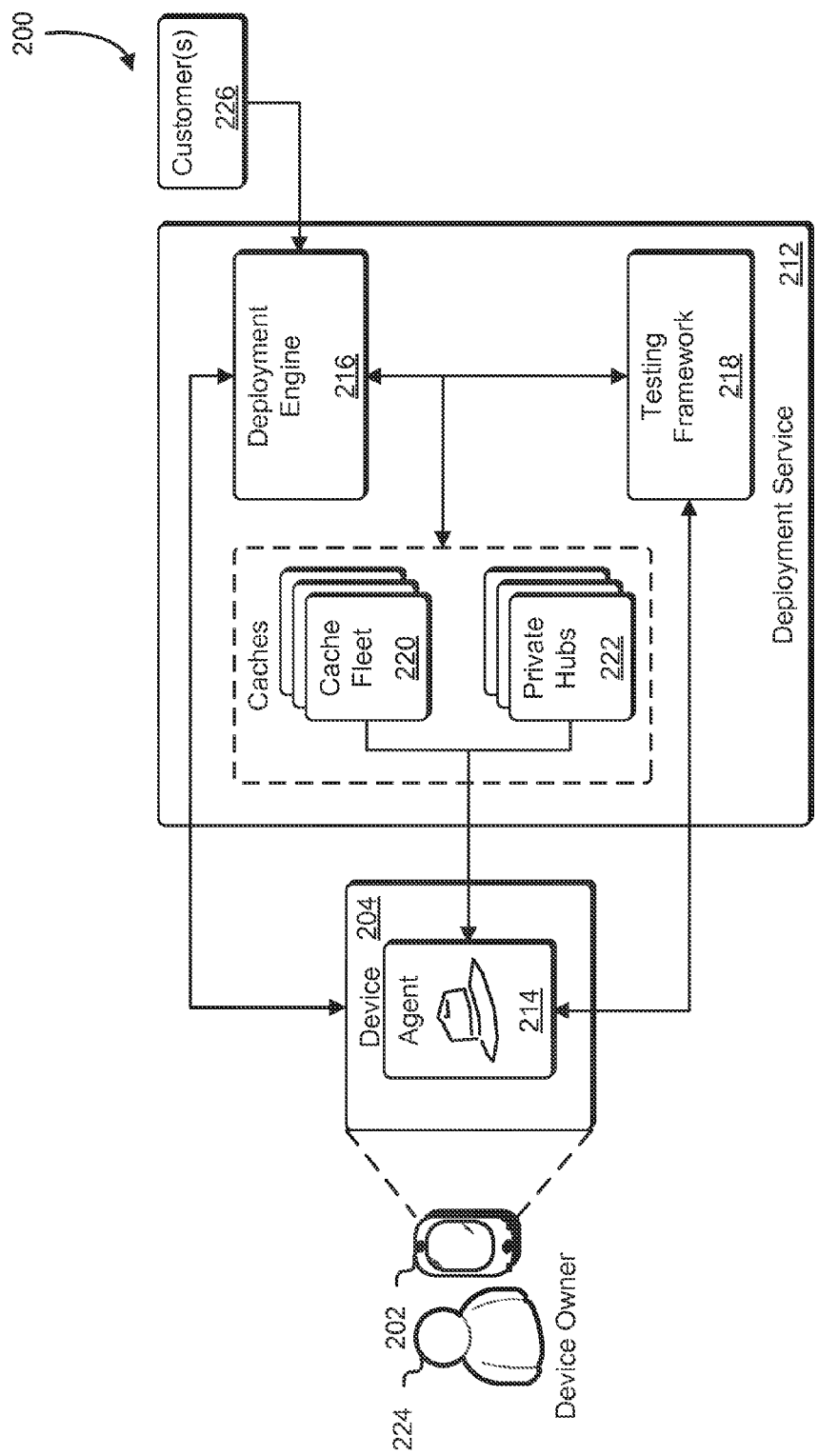
FIG. 2 illustrates an example of a deployment service in communication with a deployment agent on a device in accordance with an embodiment.

FIG. 2 illustrates an environment 200 in which an embodiment may be practiced. As illustrated in FIG. 2, the environment 200 may include an owner 224 of a device 202 having a deployment agent 214 executing on the device 202. The deployment agent 214 may be configured to act as an intermediary between the device 202 and the deployment service 212. The deployment service 212 may comprise one or more functional modules, supported by hardware and software, for receiving software updates from customers 226 of the deployment service 212 and for providing said software updates to devices for which the software updates are intended, such as the device 202. The functional modules may include a deployment engine 216 configured to receive software packages from the customers 226 and schedule deployment of the software packages with devices, as well as a cache fleet 220 and/or private hubs 222 configured to cache software packages and/or component files for deploying the software packages to the devices.

The owner 224 may be an authorized user of the device 202. For example, the owner 224 may be the owner (or other authorized possessor) authorized to confirm the installation of software updates to the device 202. The device 202 may be computing device, such as the computing devices described in conjunction with the device 102 of FIG. 1. As noted, the customers 226 may be providers of software for devices such as the device 202. Examples of such customers include cellular telephone providers, operating system distributors, application developers, and the like. Note that the entity represented by the customers 226 may include the computing resource service provider that provides the deployment service 212, should the computing resource service provider also provide software packages for devices like the device 202.

As noted, the deployment service 212 may be a service made available to the customers 226 and device owners for deploying software packages and software updates to devices like the device 202. The deployment service 212 may provide interfaces for communicating software packages to the deployment service 212 as well as interfaces for delivering the software packages to devices. The deployment service 212 may be implemented as one or more physical and/or virtual computing devices within a distributed computing environment, and may be configured to communicate to the customers 226 and to devices via a network, such as the Internet.

The device 202 may be configured to include a deployment agent 214. The deployment agent 214 may be integrated into the hardware of the device 202 or may be implemented as a software application, and may be configured to manage software deployment on the device 202. For example, the deployment agent 214 may be configured to communicate with and receive update information from the deployment engine 216, the cache fleet 220, and/or the private hubs 222. For example, the deployment engine 216 may notify the deployment agent 214 on the device 202 that a software update is available. The deployment engine 216 may also query the deployment agent 214 whether the device is available to receive the software update, whether the device has sufficient resources to receive the software update, and whether the device has sufficient resources to test the software update. The deployment agent 214 may be configured to respond accordingly to the queries of the deployment engine 216. If the device 202 has sufficient resources to run at least some tests on the software update, the deployment agent 214 may also be configured to cause tests to be run on software running in test containers and may provide results of the testing to the testing framework 218.

The deployment engine 216 may be comprised of one or more computing systems and may be configured to receive software packages from customers 226 of the deployment service 212, such as through an application programming interface. The deployment engine 216 may be further configured to receive values for one or more parameters of the received software packages, such as hardware and/or software requirements for executing the software packages. After receiving a software package, the deployment engine 216 may be configured to notify the device 202 that the software package is available.

In response to the notification of a software package from the deployment engine 216, the deployment agent 214 may first determine whether the device 202 has sufficient resources to launch the software package in a separate container. If the device 202 has insufficient resources to launch the software package in a separate container, the deployment agent 214 may communicate this detail to the deployment engine 216, whereupon the deployment engine 216 may determine whether to provide the software package to the testing framework 218 for testing instead of the device 202. Otherwise, if the device 202 has sufficient resources to launch the software update in a separate container, the deployment agent 214 may cause a new container to be instantiated in the background of the device 202, similar to the test container 110 of FIG. 1, if a suitable container is not already instantiated on the device 202. The deployment agent 214 may also be configured to query the deployment engine 216 about the software package contents (e.g., software libraries and other dependencies) and/or provide the deployment engine 216 with information about current versions of software libraries (e.g., glibc-2.21) or other dependencies on the device 202.

Using this information, the deployment agent 214 or the deployment engine 216, depending on the implementation, may determine differences between the software package and software currently resident on the device 202. In this manner, one software package may be created for multiple devices having different configurations, and only portions of the software package different from the software currently resident on individual devices need be provided to the individual device by the deployment service 212. Bandwidth usage and other resource usage may be conserved thereby because redundant software libraries and other dependencies need not be downloaded from the deployment service 212 when they are already resident on the device 202.

The cache fleet 220 may be one or more physical or virtual computing systems in a distributed computing environment. The cache fleet 220 may be configured to cache/store software libraries and/or software packages for deployment to compatible devices, such as the device 202. As such, one or more computing systems of the cache fleets may be located in various geographic regions, such that the software libraries and/or software packages can be provided quickly and efficiently to the device 202 from a computing system in a geographic region near to the device 202. The computing systems of the cache fleets may be configured to communicate the software libraries and/or software packages in parallel to multiple devices similar to the device 202. The deployment agent 214 or the deployment engine 216, depending on the embodiment, may communicate to the cache fleet 220 which software libraries and/or other dependencies are needed by the device 202 for the software package, based on differences between the software in the software package and software currently resident on the device 202. In response, the cache fleet 220 may provide the identified software libraries and/or other dependencies to the device 202 as needed.

Note, in some embodiments, the deployment service 212 may implement private hubs 222 alternative to or in addition to the cache fleet 220. The private hubs 222 may operate similar to the cache fleet 220 (i.e., keeping caches of software libraries, other dependencies, and/or software packages, located in various geographic regions, etc.), but each cache hub may be assigned to a specific type of device or customer. That is, the private hubs 222 may contain cache files specific to certain device configurations. Unlike the cache fleets 220, an individual private hub of the private hubs 222 may be secured against access by users, customers, and devices other those authorized to access the private hub. For example, cellular telephone Carrier A may be allocated a private hub to cache software packages customized for use by particular models of cellular telephones supported by Carrier A. Similarly, cellular telephone Carrier B may be allocated a different private hub for software packages customized for use by particular models of cellular telephones supported by Carrier B. Software packages on Carrier A's private hub may be unavailable to the users cellular telephones of Carrier B, and vice versa. The private hubs 222 may be geographically located to provide efficient software delivery to the devices targeted; for example, if Carrier A primarily supports devices in geographic region X, the private hubs 222 allocated to Carrier A may be located within geographic region X to enable devices in geographic region X to download software packages more efficiently. Furthermore, in some embodiments commonly-available software libraries may still be available to be downloaded from the cache fleet 220; in this manner, the private hubs 222 may minimize storage requirements by only hosting customized portions of software packages. Therefore, each of the private hubs 222 may be able to deliver efficiently, to its corresponding device, the files necessary to update the particular device.

As noted in the discussion of FIG. 1, the software packages may be delivered to a background container on the device 202. The running processes and resources within the software container may be isolated from other processes and resources on the device 202 and the background container. The amount of memory and processing capacity to be allocated to the background container may be specified by the customer 226 that created the software package. The customer may create the software package by configuring a software container and configuring applications and data to execute within the software container. The customer 226 may then package the configured container, applications, and data as an image (e.g., the software package), including one or more programs, data, and any system dependencies (e.g., libraries, files, etc.) that are needed for the programs to run on the operating system of the container instance. In some examples, a software "package" may refer to an entire copy of a particular state of the software container at the time the image was generated. The software package thereafter may be used to launch one or more identical containers, each of which may be assigned the specified amount of resources and may be isolated from each other. In this manner, the customer 226 can generate a software package for deployment to multiple devices. The software packages may be launched within containers on devices having the same or different hardware, and each container may be expected to run in a similar manner as the originally packaged software container.

Note that the present disclosure may refer to both a software package, in reference to software packaged for delivery to a device, as well as software "updates," indicating a software package that is different (e.g., newer version, patch containing bug fixes, etc.) from software currently resident on the device 202. However, it is contemplated that, unless otherwise indicated, functionality described with reference to software updates may also be applied software packages, including software that has not yet been installed on the device 202. Note also that one or more of the deployment engine 216, the cache fleet 220, the private hubs 222, and the testing framework 218 may not be present in various embodiments of the deployment service 212. For example, the various functionalities described in reference to the deployment engine 216, the cache fleet 220, and/or the private hubs 222 may be integrated into other components of the deployment service 212, or may be separated into additional or different modules than depicted in FIG. 2.

The testing framework 218 may be involved in different aspects of testing of software updates before the software updates are made "live" (e.g., by the software container in which the software updates are installed being switched to be the active container). A first aspect of the testing framework 218 may include receiving test results from the device 202. In some cases, this aspect may also include analyzing the test results and determining whether the software update should be made live based at least in part on whether the test results indicate that testing was successful or not. Note that in some cases, a software update may not be made live even if testing was successful. For example, a software provider may intend only to collect information about how a particular software package or update would behave on the device 202, but may not intend to release the particular software package or update to the public. In such a case, the software package or update may be tested in a container in accordance with the present disclosure, but the software container may never be made a "live" container. In these cases, the test container may be deprovisioned after testing is complete and the test results are received by the testing framework 218. In some examples, "deprovisioning" may refer to the act of removing access to a software container and freeing up resources allocated to the software container. Deprovisioning a software container may include stopping the container from running, returning any resources (e.g., memory, processing capacity, etc.) allocated to the software container to be available to other processes of the device, and removing any image or other files dedicated to the software container from persistent storage. Reasons for such cases include situations in which the customer 226 (e.g., software provider) may intend to use such collected information for future software development purposes and situations in which the customer 226 (i.e., software provider) only wants to test the software on a limited number of devices before rolling the software out, live, to a wider audience.

A second aspect of the testing framework 218 may include providing an alternative platform for testing the software updates if the device 202 has insufficient resources or is otherwise unable to perform the testing itself (e.g., the device 202 is offline, the device is busy, the owner has not given consent for the software update to be installed and/or tested on the device 202, etc.). That is, the testing framework 218 may include one or more physical or virtual computing systems configured to simulate the hardware and/or software of the device 202. For example, the testing framework 218 may cause the software update to be installed in a container of a virtual machine instance configured to simulate the device 202. The testing framework 218 may further cause tests to be performed on the software update in the virtual machine instance as if the tests were being performed on the device 202 itself, and the testing framework 218 may further receive the results of the testing at least in part for determining whether the software update should be made live. In some embodiments, the software for the virtual machine instances may be obtained from the deployment engine 216. On other embodiments, the software for the virtual machine instances may be obtained from the cache fleet 220 or the private hubs 222.

In some implementations where testing of the software package was performed on the device 202, the deployment agent 214 may be configured to determine whether testing was successful. In other implementations, the deployment agent 214 may communicate the results of the testing to the testing framework 218 (e.g., may provide a stack trace of the testing to the testing framework 218), and the testing framework 218 may determine whether testing was successful. In still other implementations, the deployment agent may communicate the results of the testing to the deployment engine 216 or may communicate the results of the testing to the testing framework 218 which may be in communication with the deployment engine 216, and the deployment engine 216 may determine whether testing was successful. In some implementations where testing of the software package was performed by the testing framework 218, the testing framework 218 may determine, based at least in part on the results of the testing, whether testing was successful. In other implementations, the testing framework 218 may communicate the results of the testing to the deployment engine 216 and the deployment engine may determine whether testing was successful.

Upon determination of successful testing, the deployment engine 216 may query the deployment agent 214 whether the device 202 is ready to accept the software package in an active container. As noted, in some cases, the device 202 may have sufficient resources to install the software package in a background container and perform some or all testing at the device 202 itself. In other cases, the device 202 may have sufficient resources to install the software package in a background container, but some or all testing may be performed at the testing framework 218 in an environment that simulates the device 202. Upon acceptance by the deployment agent 214 (which may, in some implementations, prompt the owner 224 for consent to accept the software package and may not indicate acceptance of the software package until such consent is received), if the software package is already installed on the device 202 in a background/test container, the deployment agent 214 may cause the background/test container to be switched to become the active container, and cause the previously active container to be switched to be an inactive container or switched to run as a background container. In some cases, the deployment agent 214 may cause this switching to occur in response to a an instruction to do so from the deployment engine 216. In some of these cases, the deployment agent 214 may send this instruction in response to a command to do so from the customer 226 that provided the software package (e.g., testing may have been successful, but the software provider may prefer delay making the software live until a certain date, etc.).

In still other cases, the device 202 may have insufficient resources to perform testing of the software package on the device 202 itself, or may have insufficient resources to install the software in a background container on the device 202, and in such cases, testing may be performed at the testing framework 218 as described in the present disclosure. In these cases, upon acceptance by the deployment agent 214 (which, as noted, may require obtaining consent from the owner 224), the software package may, if resources of the device 202 permit, be downloaded and installed in a background container, and the background container switched to be the active container instead of the previously active container, or, if resources on the device do not permit installation in a background container, be downloaded and installed to the active container of the device 202. Note, that if results of testing are determined to be unsuccessful, the test container and/or software package, whether located on the device 202 or the testing framework 218, may be deprovisioned from the entity upon which it was provisioned/instantiated.

Figure 3:
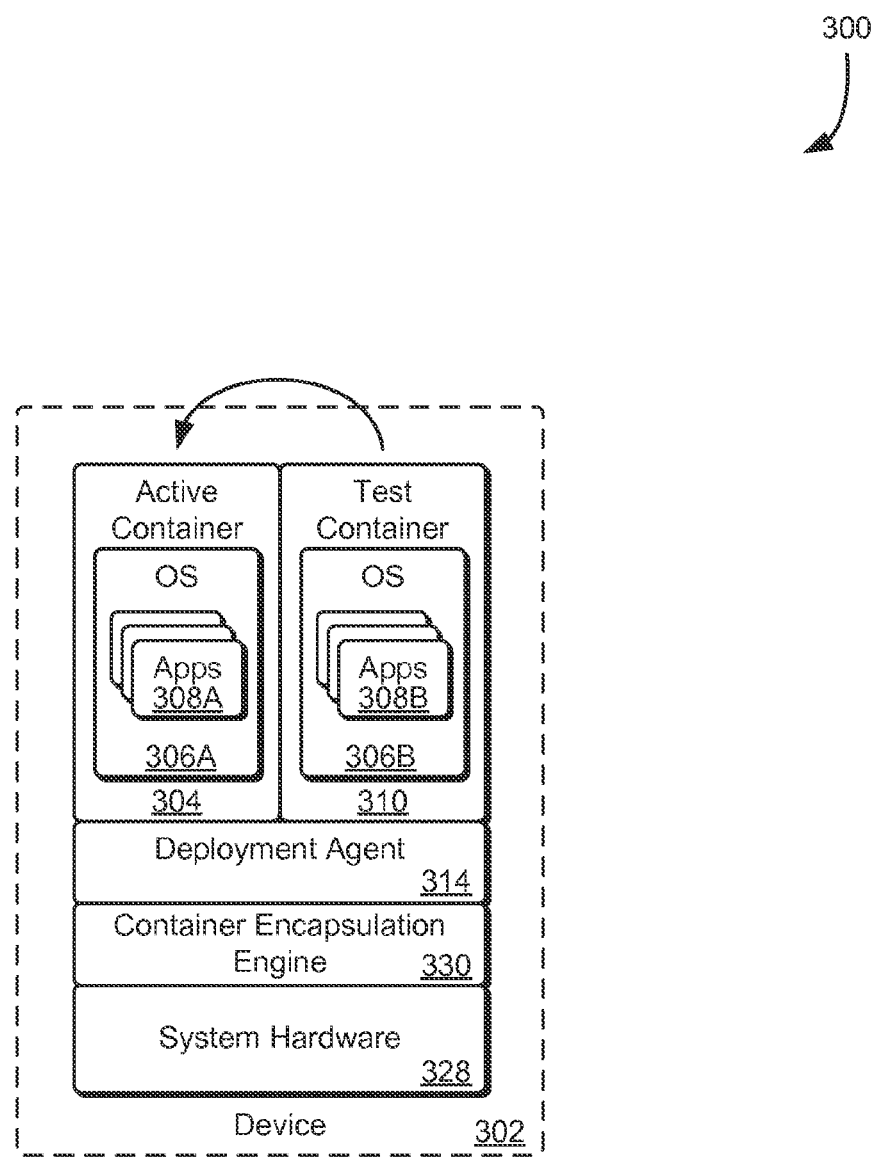
FIG. 3 illustrates an example of a device with containerization support in accordance with an embodiment.

FIG. 3 illustrates an example embodiment 300 of the present disclosure. Specifically, FIG. 3 depicts a device 302 with system hardware 328 that supports running a container encapsulation engine 330. The container encapsulation engine 330 may support running one or more containers, such as an active container 304. The container encapsulation engine 330 may also support running one or more background containers, such as a test container 310. The software containers may be configured with respective operating systems 306A-06B and one or more applications 308A-08B. The container encapsulation engine 330 may further be configured to run a deployment agent 314 for communicating with a deployment service and for managing software deployments on the device 302. The device 302 may be a device similar to the types of devices described for the device 102 of FIG. 1. The active container 304 may be a software container configured run in the foreground, similar to the active container 104 of FIG. 1, such that the user is able to interact with the first operating system 306A and applications 308A executing within the active container 304.

The test container 310 may be configured to run in the background and may contain the second operating system 306B and applications 308B, similar to the test container 110 of FIG. 1, which may not interact with the user on the device. Rather than interact with the user, the test container 310 may be inactive unless it is provided input from the deployment agent 314. For example, the deployment agent 314 may receive instructions for testing the second operating system 306B and/or applications 308B from a deployment service. In this example, in accordance with the testing instructions, the deployment agent 314 may provide simulated user input to the second operating system 306B and/or applications 308B in order to monitor how the second operating system 306B and/or applications 308B respond to the provided input. The test container 310 may be one of multiple test containers. Each such test container may be installed with the same software package, but may be caused to perform the same or different tests on the software in parallel with the other test containers. For example, a first test container may be configured to perform boundary testing on the software in the first test container, while a second test container may be configured to perform fault injection testing on the software in the second test container, and a third test container may be configured to perform battery life testing in the third test container.

Additionally or alternatively, multiple test containers may be installed with different software packages, and each test container may be caused to perform tests on its installed software package in parallel with other test containers. In some implementations, the operating system 306B and/or one or more of applications 308B may be instrumented to measure the execution performance of the software, trap errors, and/or provide trace information to the deployment agent 314. The deployment agent 314 may, in turn, communicate the provided information to a testing framework of the deployment service for determination of the level of success of the testing.

The operating systems 306A-06B may be configured to execute as operating systems in isolation from each other. The first operating system 306A may be the same or different operating system as the second operating system 306B. Likewise, the applications 308A-08B may be configured to execute within their corresponding operating systems 306A-06B, and the first set of applications 308A may be the same or different as the second set of applications 308B.

The deployment agent 314 may be an application running on the device 302 that is configured to communicate with a deployment service. The deployment agent 314 may be configured to respond to queries by the deployment service, such as queries as to whether the device 302 is available to accept a software package, has sufficient resources available to receive the software package, and has sufficient resources to test the software package. The deployment agent 314 may also be configured to receive results from testing of the installed software packages, such as the second operating system 306B and/or 308B, within the test container 310, and may communicate those results to the deployment service. Note that the deployment agent may be configured to run in various ways, including within one or more containers, within its own container, or to run in parallel with the container encapsulation engine 330. Furthermore, in some implementations, there may be multiple deployment agents on the device 302; for example, a device 302 may have multiple test containers for testing different software packages, and each test container may have a corresponding deployment agent.

The system hardware 328 represents the hardware of the device 302 implemented to support the other components of the device 302 depicted in FIG. 3, including memory, one or more processors, firmware, input/output devices, display devices, and other hardware as may be necessary to support containerization. The container encapsulation engine 330 may be a software system executing on the system hardware 328 and configured to allow one or more software containers, such as the active container 304 and test container 310, to run within a single operating instance. Examples of container encapsulation systems include the Docker container engine, the Parallels Virtuozzo container engine, and the Solaris container engine.

The example embodiment 300 further illustrates a blue-green deployment strategy that may be implemented by embodiments of the present disclosure. Blue-green deployment minimizes downtime necessary to take software from a testing stage to live production. Blue-green deployment accomplishes this downtime reduction by performing its testing in a test environment (green environment) as identical to the live production environment (blue environment) as possible. Once testing of the green environment indicates that the software is ready to go live, the green environment is switched to become the live environment, and the blue environment is allowed to become idle. Thus, as illustrated in FIG. 3, when the test container 310 is determined to be ready to go live, the status of the test container 310 (green environment) may be switched to become a new active container, such that user input and output flow to and from the new active container. Similarly, the status of the previously active container 304 may be changed such that the previously active container 304 becomes inactive/idle. Another advantage of blue-green deployment is that if any issues arise, the blue environment can be quickly reactivated and the green environment can likewise be deactivated. Thus, in the present disclosure, if issues are discovered with the new active container, the new active container can be deactivated and the previously active container 304 may be reactivated as the active container.

Figure 4:
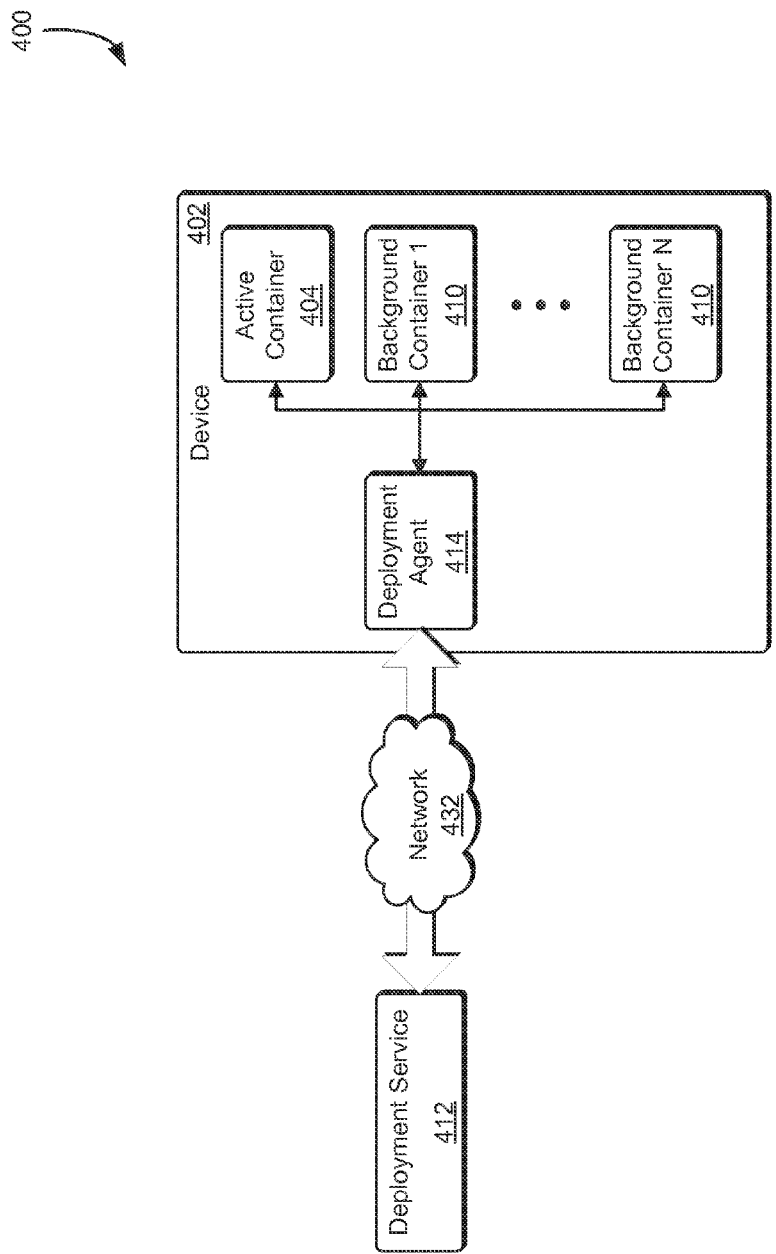
FIG. 4 illustrates an example of a device with multiple background containers in accordance with an embodiment.

FIG. 4 illustrates an aspect of another environment 400 in which an embodiment may be practiced. Specifically, FIG. 4 depicts a device 402 having an active container and a plurality of background containers 410. A deployment service 412 may provide software packages through a network 432 via a container agent 414 acting as an intermediary between the background containers 410 and the deployment service. The deployment service 412 may be a service similar to the deployment service 212 of FIG. 2. The device 402 may be a device like the device 102 or the device 202 described in conjunction with FIGS. 1 and 2 respectively. Likewise, the active container 404 may be a container similar to the active container 104 of FIG. 1 or the active container 304 of FIG. 3.

The network 432 represents the path of communication between the deployment service 412 and the device 402. Examples of the network 106 include the Internet, a local area network, a wide area network and Wi-Fi. The background containers 410 may be configured to launch and test one or more software packages received from the deployment service 412. Alternatively or additionally, one or more of the background containers 410 may contain a software configuration that may be utilized as an alternate active container, and the user of the device 402 may select which of the background containers 410 the user wishes to be the current active container 404. Alternatively or additionally, a provider of software packages for the device (e.g., cellular telephone carrier) may select which of the background containers 410 to use on the device as the current active container 404. For example, the active container 404 may include a first operating system and a first set of applications compatible with the first operating system. A background container of the plurality of background containers may include a second operating system, different from the first operating system, and a second set of applications compatible with the second operating system. In this manner, the user may be able to cause the device to switch the background container to be the active container in order to use an application from the second set of applications, such as in the event that the application from the second set of applications is incompatible with the first operating system. There may be any number of such alternate containers on the device 402, only as limited by the resources available to the device 402.

Figure 5:
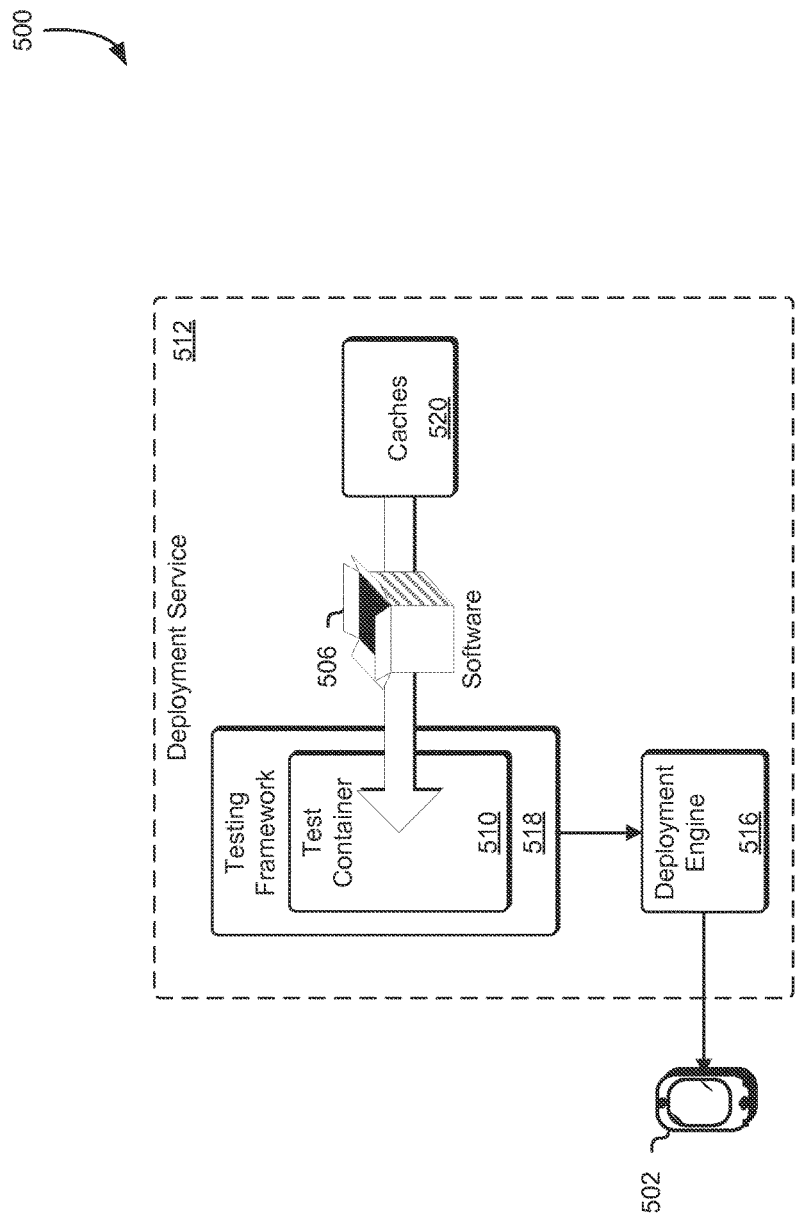
FIG. 5 illustrates an example of testing framework performing testing of a software package for a device in accordance with an embodiment.

FIG. 5 illustrates an aspect of an environment 500 in which an embodiment may be practiced. Specifically, FIG. 5 depicts a device 502, having insufficient resources to test a software package 506 interacting with a testing framework 518 and a deployment engine 516 of a deployment service 512. The device 502 may be a device like the device 102 or the device 202 described in conjunction with FIGS. 1 and 2 respectively. The device 502 depicted in the environment 500, as noted, may be a device capable of running the software of the software package 506, but may be unable to perform adequate testing of the software. For example, one or more of the intended tests may require more time or resources to perform than would be acceptable by a user of the device 502. As another example, a user of the device 502 may have denied consent to allow such testing to be performed on the device 502 (e.g., through settings on the device or through input on a confirmation dialog). As yet another example, the device 502 may be temporarily out of communication with the deployment service 512 (e.g., the device may be outside of WiFi range) and therefore unable to receive the software package 506 for testing. Note that in some cases, there may be some tests that may be performed on the device 502 itself, as described in the present disclosure, parallel with other tests being in parallel in the test container 510 of the testing framework 518. For example, the testing framework 518 may be configured to perform more resource-intensive tests than those being performed on the device 502 itself.

As noted, the deployment service 512 may be a service provided by a computing resource service provider for deploying software packages, such as the software package 506, to computing devices, such as the device 502. The software package 506 may be a software package or software update, as described in the present disclosure, configured to launch as software in a software container. The contents of the software package 506 may vary, and may include, for example, configuration file data, database records, one or more software applications, library files, precompiled executable instructions, uncompiled software code/executable instructions, and/or entire operating systems. The software package may be provided to the deployment service by a software provider and may be configured to be used only for specific devices, in this case, the device 502.

The test container 510 may be a software container intended to simulate an active container running on the device 502, and, as such, may be implemented as may be a virtual machine instance or may be configured to run within a virtual machine instance of the testing framework 518. Thus, the software package 506 may be launched within the test container 510, just as it would be launched in a software container on the device 502. Like testing performed on devices as described in the present disclosure, each application within the test container 510 may need to be tested; for example, even if only one application of the software package 506 is different or updated from the applications actively running on the device 502, every other application within software package 506 may need to be tested in the test container 510 to confirm that the application that changed does not cause issues with applications that have not changed. Test data, such as errors, completion times, warnings, and successful test results may be logged by the testing framework 518 for later determination whether the testing was successful, and may also be provided to the software provider of the software package 506 to aid future software development and/or determining the cause of software errors.

The deployment engine 516 may be comprised of one or more computing systems and may be configured to interact with the device 502, including notifying the device 502 that testing for the software package 506 was successful and that the device 502 may, if not already downloaded, download the software package 506 and launch it in a container on the device 502. Once launched on the device 502, such notification may also serve as notice to the device 502 that it may, based at least in part on the successful test results, safely make the software container containing the software package 506 on the device 502 its active container.

The testing framework 518 may test containers, such as the test container 510 corresponding to the device 502. The testing framework 518 may obtain the software package 506 intended for the device 502 from the caches 520, install the software package 506 in the test container 510, and cause tests to be performed on the software in the test container 510 as if the tests were being performed on the device 502 itself. The testing framework 518 may also determine, based at least in part on the test results, whether the software package 506 should be made live on the device 502.

The caches 520 may be one or more physical or virtual computing systems in a distributed computing environment, similar to the cache fleet 220 and or the private hubs 222 of FIG. 2. The caches 520 may be configured to store software libraries or software packages (including software updates) for deployment to devices, such as the device 502.

Figure 6:
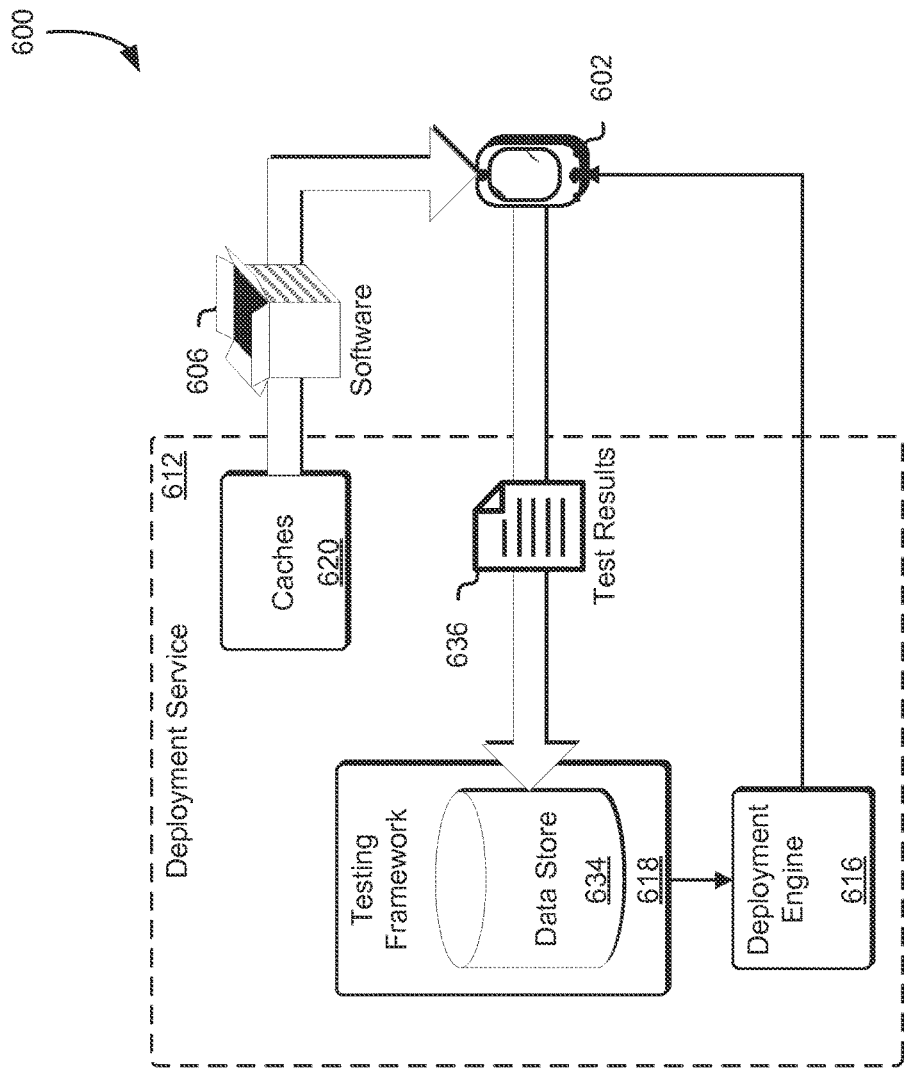
FIG. 6 illustrates an example of a testing framework receiving results from testing of a software package on a device in accordance with an embodiment.

FIG. 6 illustrates an aspect of an environment 600 in which an embodiment may be practiced. Specifically, FIG. 6 depicts a device 602, having sufficient resources to test a software package 606 interacting with a testing framework 618 and deployment engine 616 of a deployment service 612, and providing test results 636 to a data store 634 of the deployment service 612. The device 602 may be a device like the device 102 or the device 202 described in conjunction with FIGS. 1 and 2, respectively. The device 602 depicted in the environment 600, as noted, may be a device capable of running the software of the software package 606 and also capable of performing some or all testing of the software. As noted, the deployment service 612 may be a service provided by a computing resource service provider for deploying software packages, such as the software package 606, to computing devices, such as the device 602.

The testing framework 618 may be configured to receive the test results 636 of the testing performed on the software package 606 provided to the device 602, and may be configured to store the test results 636 in the data store 634. The data store 634 may be a database, set of files, or other storage device or component for storing data. The testing framework 618 may also determine, based at least in part on the test results 636, whether the software package 606 should be made live on the device 602. The caches 620 may be one or more physical or virtual computing systems in a distributed computing environment, similar to the cache fleet 220 and/or the private hubs 222 of FIG. 2. The caches 620 may be configured to store software libraries, software packages (including software updates) for deployment to devices, such as the device 602.

The software package 606 may be a software package or software update, as described in the present disclosure, similar to the software package 506 described in conjunction with FIG. 5, configured to launch as software in a software container. The software package may be provided to the deployment service by a software provider and may be configured to be used only for specific devices, in this case, the device 602. The deployment engine 616 may be comprised of one or more computing systems and may be configured to interact with the device 602, including notifying the device 602 that testing for the software package 606 was determined by the testing framework to be successful, and that the device 602 may safely make its test container its active container.

The software package 606 may be launched within a test container on the device 602, similar to the test container 110 on the device 102 of FIG. 1. Each application of the software package 606 may need to be tested within a test container; for example, even if only one application of the software package 606 is different or updated from the applications currently running in an active container on the device 602, every other application within software package 606 may need to be tested to confirm that the application that changed does not cause issues with applications that have not changed. Test data, such as errors, completion times, warnings, and successful test results may be provided by the device 602 as the test results 636 to the data store 634 of the testing framework 618 for later determination whether the testing was successful or for providing to the software provider of the software package 606 to aid future software development and/or determining the cause of software errors.

A deployment agent running on the device 602 may be configured to determine a balance between resource usage on the device 602 and test performance for testing. For example, in a situation in which network bandwidth is a constraint and processing capability is in abundance, processing resources may be utilized to compress data streams being communicated through the network. Conversely, in situations in which there is an excess of network bandwidth but processing power is limited, the deployment agent may be configured to cause fewer processing resources of the device 602 to be used for testing and cause some of the processor-intensive testing to be performed at the testing framework, such as in the manner described in FIG. 5.

Figure 7:
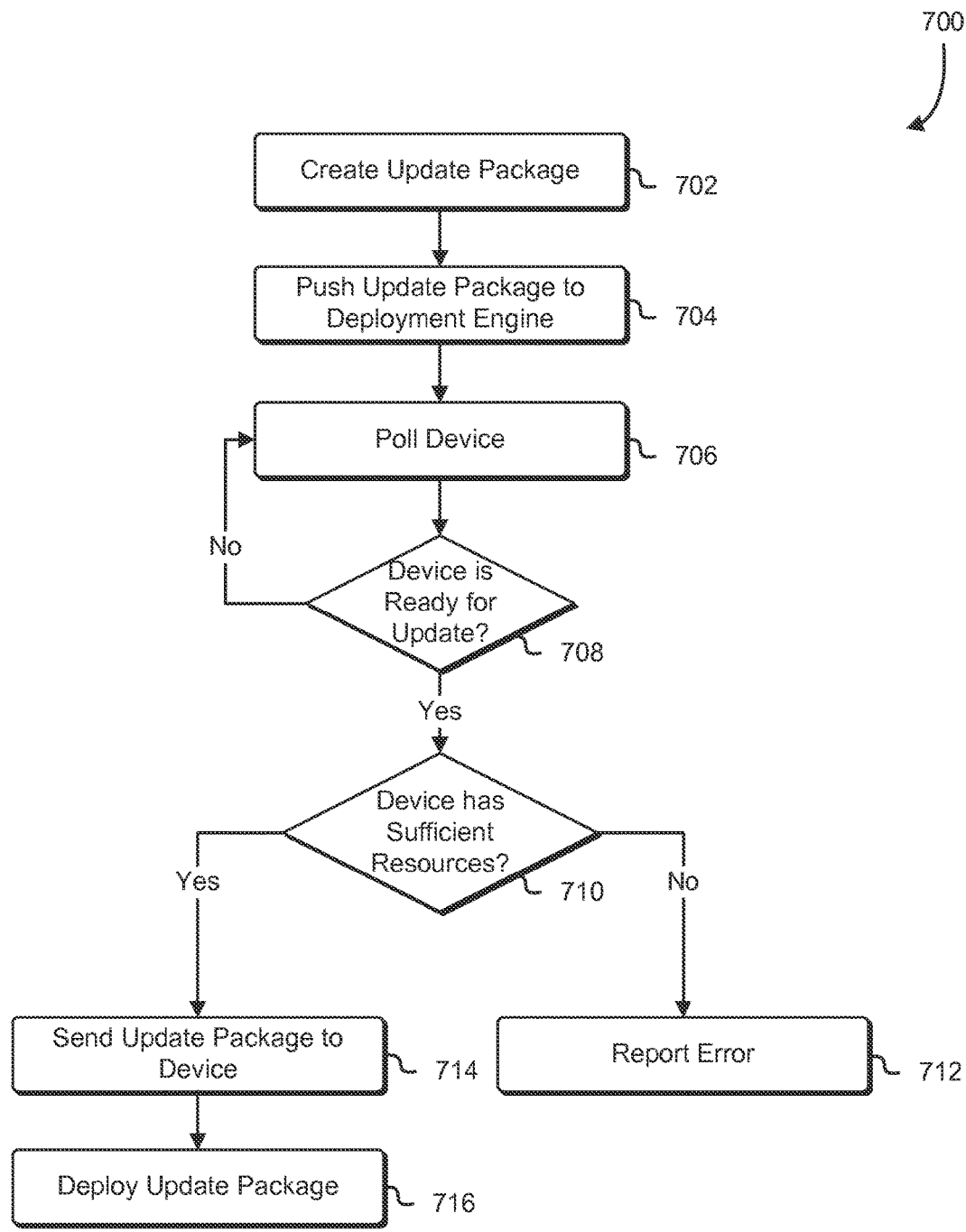
FIG. 7 is a flow chart that illustrates an example of deploying a software update to a device in accordance with an embodiment.

FIG. 7 is a flow chart illustrating an example of a process 700 for deploying a software update to a device in accordance with various embodiments. The process 700 may be performed by any suitable system, such as a server in a data center, multiple computing devices in a distributed system of a computing resource service provider, or any electronic client device such as the electronic client device 902 described in conjunction with FIG. 9. The process 700 includes a series of operations wherein a customer of a deployment service pushes a software update to the deployment service, and the deployment service sends the update to devices that indicate they are available to receive the software update.

In 702, a provider of software for certain computing devices may create a containerized software package for deployment to the certain computing devices. As noted, the software package may include a set of one or more files configured to execute within a software container on the device. The software package may comprise new software for specified devices or may comprise updates (e.g., bug fixes, additions, or removals to existing software, etc.) to software currently resident on specified devices. The software package may comprise at least a portion of the files and libraries necessary to execute the packaged software, although, as will be described, in many cases, the software package may include all files necessary to execute the packaged software and the deployment service or a deployment agent on the device and/or the container encapsulation engine on the device may selectively choose which files of the set of files need to be downloaded to the device. That is, files and libraries resident on the device of the same version as in the software package need not be downloaded to the device, as the device already has them, thereby conserving network and storage resources.

In 704, the software provider may provide the software package to a deployment engine of a deployment service, such as via an application programming interface provided by the computing resource service provider that provides the deployment service.

In 706, the deployment service may notify a device identified as a potential recipient of the software package that the software is available and/or may query the device as to whether the device is ready to receive the software package.

In 708, a determination is made whether the device has indicated that it is ready to receive the software package. For example, if the device indicates that it is not yet ready to receive the update (e.g., the device is busy, authorized user has not given consent, etc.), the system performing the process 700 may return to 706 (possibly after waiting a predetermined interval) and poll the device again. Similarly, if no response is received from the query of 706, the system performing the process 700 may wait a predetermined interval and re-poll the device in 706. Otherwise, if acknowledgement is received from the device that the device is ready to receive the software package, the system performing the process 700 may proceed to 710, whereupon a determination may be made as to whether the device has sufficient resources to receive the software package.

If the device has insufficient resources to receive the software package, the system performing the process 700 may proceed to 712 where it may log this detail and/or respond to the device that the software package cannot be provided. For example, the device may have insufficient storage available to receive the software package, and therefore the device may need to free up some storage space (e.g., by deprovisioning idle containers, deleting unnecessary files, etc.). As another example, the device may have insufficient random access memory or processing capability available, and therefore the device may not be able to receive the software package until the device is updated to meet certain minimum requirements.

Otherwise, in 714, if the device has sufficient resources to receive the software package, the system performing the process 700 may provide the software package to the device, such as through an Internet or WiFi network connection.

Lastly, in 716, the system performing the process 700 may cause the software update to be deployed in a container on the device. In some implementations, this may be caused by a deployment agent on the device launching the software package within a container on the device. As noted in the present disclosure, in some cases, the software package may be launched into a test container, whereupon a series of tests may be performed on the software package before the test container is switched to be the active container.

Note that one or more of the operations performed in 702-16 may be performed in various orders and combinations, including in parallel. For example, in some implementations, the system performing the process 700 may determine whether the device has sufficient resources in 710 prior to determining whether the device is ready for updates in 708.

Figure 8:
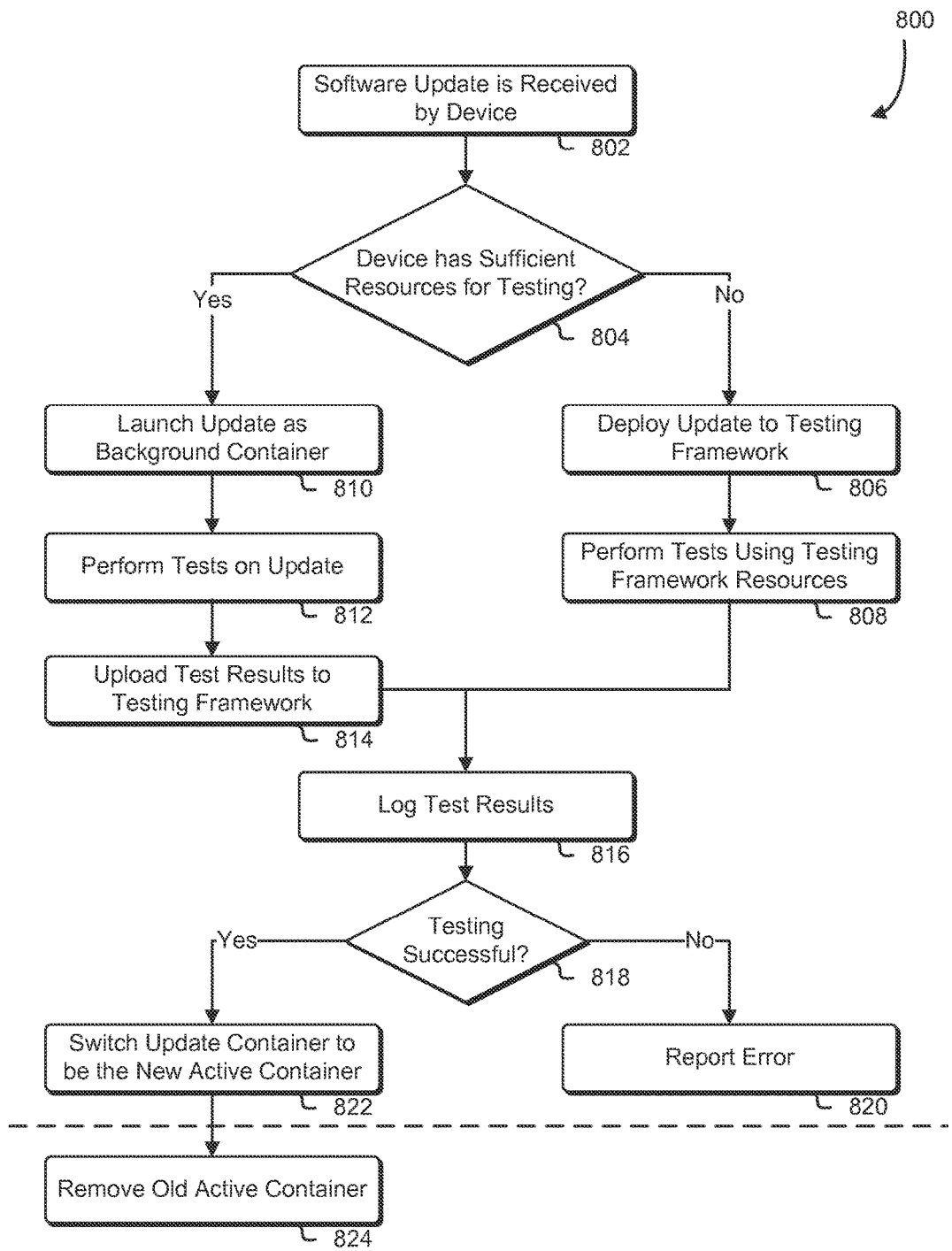
FIG. 8 is a flow chart that illustrates an example of testing a software update in accordance with an embodiment.

FIG. 8 is a flow chart illustrating an example of a process 800 for testing a containerized software package in accordance with various embodiments. The process 800 may be performed by any suitable system, such as a server in a data center, multiple computing devices in a distributed system of a computing resource service provider, or any electronic client device such as the electronic client device 902 described in conjunction with FIG. 9 in combination with a suitable device, such as the device 102 of FIG. 1. The process 800 includes a series of operations wherein a device receives a software package, the software package is installed and tested, and, based on the results of the testing, the software package is made live.

In 802, a software package is received by a device in a manner that may be similar to the operations of 716 of FIG. 7. That is, the software package may be a set of files created by a provider of software for the device and provided to a deployment service, and the device, having resources sufficient to receive the software package, is provided the software package by the deployment service.

In 804, a determination is made whether the device has sufficient resources to perform tests on the software. For example, the device may have had enough storage resources to receive the update in 802, but may not have enough memory, processing power, or storage resources to perform tests on the received software. In such a case in which the device may not have enough resources to perform the testing, the system performing the process may proceed to 806, whereupon the software update may be provided to a testing framework of a deployment service for testing. As noted, the testing framework may include container instances configured to simulate how the software package would be installed and perform on the device itself. Thus, the software package may be installed to execute within one of these container instances corresponding to the device on the testing framework.

Then, in 808, tests may be performed on the software installed in the container instance on the testing framework in the same manner as it would have been tested on the device if the device had sufficient resources to perform the testing itself. Testing may include white-box testing and/or black-box testing. For example, tests may be designed to cause all program statements within the software package to be executed at least once and/or faults may be introduced into the software package to determine the efficacy of the testing and fault handling of the software package.

Additionally or alternatively, tests may be driven by one or more scripts, may be configured to simulate input from various input sources (e.g., touches on a touch screen, motion sensors, camera input, keyboard input, etc.), and may be configured to simulate error conditions. The software package may be instrumented to measure the execution performance of the software, trap errors, and/or provide trace information. In some embodiments, tests or test scripts may be dynamically generated based on usage of the device. For example, a deployment agent on the device may be configured to learn client/user usage patterns based on previous usage of the device and/or applications running on the device by the client/user. Then, when managing the testing, the deployment agent may implement a testing strategy of the software under test based at least in part on the usage patterns (e.g., by cloning or simulating actual events/inputs that occurred with previous versions of the software). As another example, the deployment agent may have recorded one or more series of events/inputs that cause an error with software currently installed in an active container and may feed a simulation of these events to the software being tested to determine whether a new software version fixes the error being exhibited by the current software version.

As still another example, as a user uses the applications of the device in the active container, the user input may also be sent (e.g., via the deployment agent) to the test container to assess how the test container responds to actual input. In some embodiments, testing may be performed on both the active container and the test container. For example, when the device is idle, the same tests run on the software running in the test container may be performed on the software running in the active container. In this way, the tests results from each container may be compared. Thus, it can be determined from the test results whether a software update performs as well or better than the software currently in use. Likewise, some implementations may support multiple test containers on the same device. For example, software provider may provide a different software package to each test container, perform testing on each, and compare the results to determine which of the different software packages performed the best, fastest, used the least amount of battery power, etc.

As an example, the device may be an electronic reader device having applications for downloading and displaying electronic books, applications for downloading and displaying news articles from various internet sources, and applications for converting text to audio for hearing impaired users. Thus, testing of such a device can include determining that its applications load within a certain amount of time and are otherwise installed correctly and determining whether the device can support receiving the volume and variety of network communications needed. Testing of applications can further include determining the resource usage and requirements of each application, measuring the amount of time each application takes to launch, and determining whether any application is reporting an error.

A deployment agent resident on the device may be responsible for provisioning and deprovisioning the software containers on the device, initiating the tests, obtaining results of the tests, and communicating the results of the tests to the deployment service. The deployment agent may also be responsible for monitoring the health and status (e.g., "idle," "ready to receive update," etc.) of the device, and communicating this health and status of the device to the deployment service.

However, if the device has sufficient resources (e.g., meets predetermined requirements for memory, processing capability, storage, etc.) for testing the software package on the device itself, the system performing the process 800 may proceed to 810, whereupon the software package may be launched within a background container on the device, such as the test container 110 of FIG. 1, the test container 310 of FIG. 3, or the background containers 410 of FIG. 4. In 812, the tests may be performed on the executing software package in the background container. In some implementations, the testing may be caused to be performed by a deployment agent executing on the device. In other implementations, testing may be caused to be performed by instructions within the software package itself or by a container encapsulation engine on the device. In 814, as tests are performed or after testing is complete, results of tests may be uploaded from the device to a testing framework of the deployment service.

Then, in 816, whether the tests were performed on the device itself or at the testing framework, the results of the tests may be logged at the testing framework. In 818, a determination is made whether the testing of the software package was successful. In some cases, a test failure may indicate one or more severity levels of the failure. Thus, failures of certain low-priority tests or certain failures having low severity (e.g., execution performance being below a threshold but within certain parameters may be of low severity) may not alone be determinative of unsuccessful testing, whereas certain other failures (e.g., data corruption, program crashes, memory overruns, etc.), even if only one occurrence, may be determinative of an unsuccessful test of the software package. Low severity failures and/or failures of certain low priority tests, however, may be determinative of unsuccessful testing if such failures exceed a threshold number of occurrences during testing. Therefore, it is contemplated that various methods of testing may be performed, and various ways of determining the failure or success of such tests may exist. If testing was unsuccessful, in 820, this detail may be logged and/or other entities may be notified of the test failure, such as the software provider or the device user. In some cases, if the testing was unsuccessful, the test container may be deprovisioned.

Otherwise, if testing of the software package was successful, in 822, the background container with the software package may be switched to be the new active container of the device, and the previously active container may be switched to be an inactive or background container. In some cases, the operations of 822 may be performed only when the device indicates that it is ready for the switch, such as after the device has been idle for an amount of time, suggesting that the user is not currently using the device.

Finally, in 824, the previously active container may be deprovisioned from the device, such as for the purpose of freeing up allocated resources or making room for a new software package container. The dashed line of FIG. 8 is intended to illustrate that the operations of 824 may occur at a later time than the operations of 802-22. For example, it may be advantageous to retain the previously active container for some minimum retention period (or even indefinitely), or until a second software update becomes available, as a hedge against a situation in which issues arise with the software package that were not discovered during testing. In such a situation, the deployment service may send a rollback notification to the device, and, in response, a deployment agent on the device may cause the previously active container to be quickly re-activated to be the active container on the device (rendering the new active container inactive), and the device may be thereby rolled back to its previous state before the software package was installed. Otherwise, after the retention period has passed, the previously active container may be deprovisioned as needed. Note also that one or more of the operations performed in 802-24 may be performed in various orders and combinations, including in parallel.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 9:
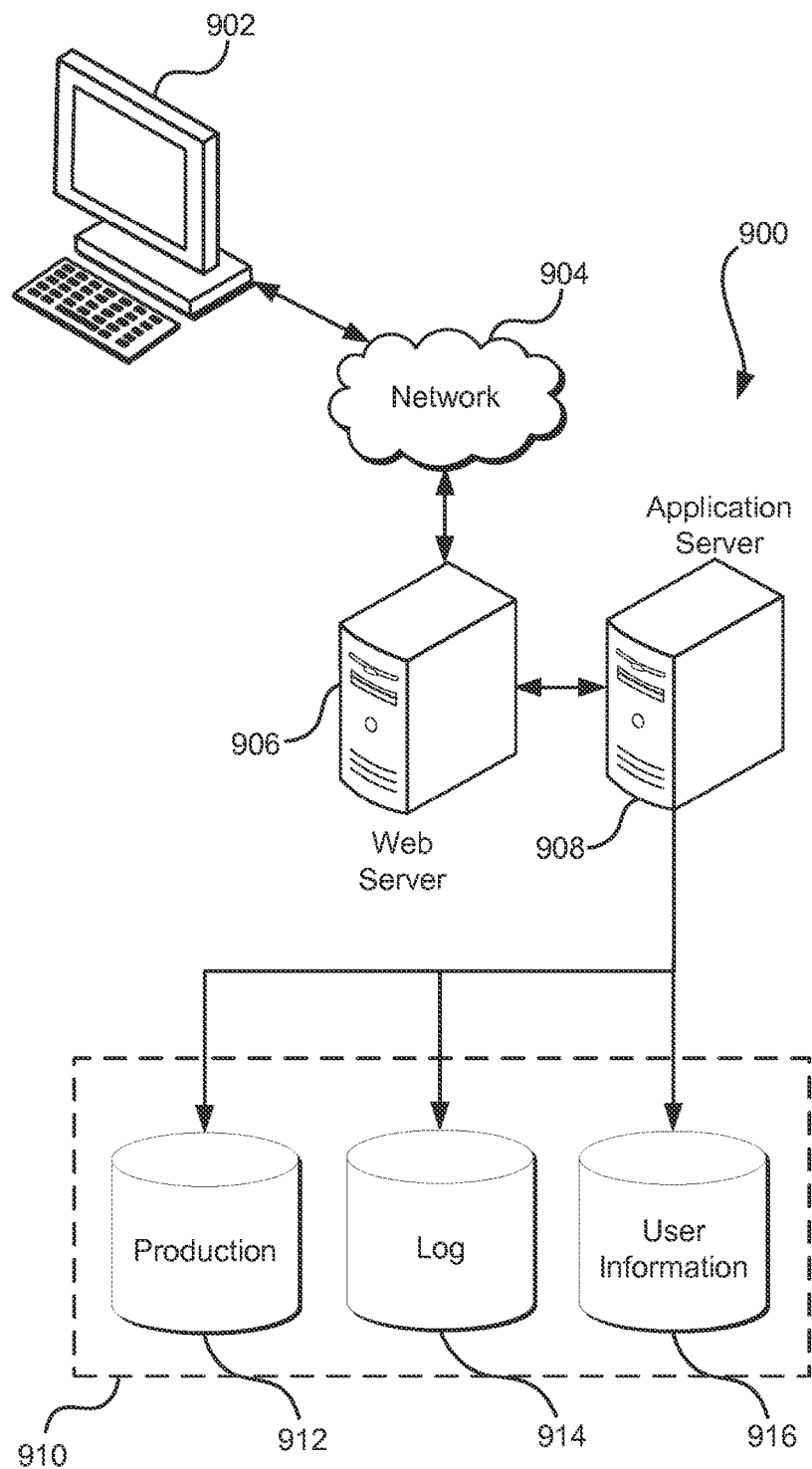
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 904 can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network 904 can be enabled by wired or wireless connections and combinations thereof. In this example, the network 904 includes the Internet, as the environment includes a web server 906 for receiving requests and serving content in response thereto, although for other networks an alternative device serving a similar purpose could be used as would be apparent to one of ordinary skill in the art.

The illustrative environment includes an application server 908 and a data store 910. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 908 can include any appropriate hardware, software and firmware for integrating with the data store 910 as needed to execute aspects of one or more applications for the electronic client device 902, handling some or all of the data access and business logic for an application. The application server 908 may provide access control services in cooperation with the data store 910 and is able to generate content including, text, graphics, audio, video and/or other content usable to be provided to the user, which may be served to the user by the web server 906 in the form of HyperText Markup Language ("HTML"), Extensible Markup Language ("XML"), JavaScript, Cascading Style Sheets ("CSS"), or another appropriate client-side structured language. Content transferred to a client device may be processed by the electronic client device 902 to provide the content in one or more forms including, forms that are perceptible to the user audibly, visually and/or through other senses including touch, taste, and/or smell. The handling of all requests and responses, as well as the delivery of content between the electronic client device 902 and the application server 908, can be handled by the web server 906 using PHP: Hypertext Preprocessor ("PHP"), Python, Ruby, Perl, Java, HTML, XML, or another appropriate server-side structured language in this example. It should be understood that the web server 906 and application server 906 are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store 910 may include mechanisms for storing production data 912 and user information 916, which can be used to serve content for the production side. The data store 910 also is shown to include a mechanism for storing log data 914, which can be used for reporting, analysis or other purposes. It should be understood that there can be many other aspects that may need to be stored in the data store 910, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server 908. In one example, a user, through a device operated by the user, might submit a search request for a certain type of item. In this case, the data store 910 might access the user information 916 to verify the identity of the user and can access the catalog detail information to obtain information about items of that type. The information then can be returned to the user, such as in a results listing on a web page that the user is able to view via a browser on the electronic client device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the example environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 904 can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 9. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
    under the control of one or more computer systems configured with executable instructions,
       obtaining a set of computer-executable instructions configured to launch and execute within a software container;
       determining a subset of the set of computer-executable instructions that is not currently resident on a client device having a first software container, where the first software container is an active container having one or more applications executing in a user space accessible by a user of the client device;
       determining that the client device is ready to receive the subset of the set of computer-executable instructions in a second software container running in parallel with, and in a separate user space from, the first software container, the first software container and the second software container being operating system-level virtualization environments;
       providing the subset of the set of computer-executable instructions to the second software container of the client device; and
       at a time after determining that the client device has sufficient resources for testing the computer-executable instructions in the second software container:
          causing the computer-executable instructions to execute in the second software container on the client device;
          causing the client device to perform a set of tests on the executing computer-executable instructions;
          receiving results of the performed set of tests from the client device;
          determining, based at least in part on the results, that the testing was successful;
          causing the second software container to replace the first software container as the active container; and
          causing the first software container to become an inactive container.

2. The computer-implemented method of claim 1, wherein the method further includes:
    retaining the inactive container on the client device for a minimum retention period; and
    after the minimum retention period has passed, deprovisioning the inactive container.

3. The computer-implemented method of claim 1, wherein the inactive container is a first inactive container and:
    the client device has a third software container running in parallel with, and in a separate user space from, the first software container and the second software container; and
    upon selection by a user of the client device for the third software container to be the active container of the client device:
       causing the third software container to be the active container; and
       causing the second software container to be a second inactive container.

4. The computer-implemented method of claim 1, wherein the inactive container is a first inactive container and:
    the client device has a third software container running in parallel with, and in a separate user space from, the first software container and the second software container; and
    upon instruction from a provider of the set of computer-executable instructions to cause the third software container to be the active container of the client device:
       causing the third software container to be the active container; and
       causing the second software container to be a second inactive container.

5. The computer-implemented method of claim 1, wherein the set of computer-executable instructions include instructions configured to execute an operating system different from an operating system executing in the first software container.

6. The computer-implemented method of claim 1, wherein the method further includes:
    determining to reactivate the first software container; and
    based at least in part on the determination:
       causing the first software container to be the active container; and
       causing the second software container to be an inactive container.

7. The computer-implemented method of claim 1, wherein:
    the user space of the first container is a first portion of memory allocated to a first set of applications executing in the first container;
    the user space of the second container is a second portion of memory allocated to a second set of applications executing in the second container;
    the first set of applications are unable to access the second portion of memory; and
    and the second set of applications are unable to access the first portion of memory.

8. A client device, comprising:
one or more processors; and
memory including instructions that, as a result of execution by the one or more processors, cause the client device to:
receive a notification from a deployment service indicating that a software package is available for the client device;
respond to the deployment service that the client device is ready to receive at least a portion of the software package;
obtain at least the portion of the software package from the deployment service and launch at least the portion of the software package as a first set of instructions executing in a first software container;
perform a set of tests on the first executing set of instructions and provide a first set of results of the performed set of tests to the deployment service;
perform the set of tests on a second executing set of instructions, executing in a second software container currently set to be an active container, to yield a second set of results;
provide the second set of results to the deployment service; and
upon receiving a notification from the deployment service to activate the first software container, the notification based at least in part on a comparison of the first set of results with the second set of results, cause the active container to be an inactive container, and cause the first software container to be an active container.

9. The client device of claim 8, wherein the instructions further include instructions that cause the client device to determine usage patterns based at least in part on previous usage of the client device by a user and the instructions that cause the client device to perform the set of tests, further include instructions that cause the client device to implement a testing strategy based at least in part on the usage patterns.

10. The client device of claim 8, wherein the instructions further include instructions that cause the client device to:
receive a rollback notification from the deployment service that the software package is to be rolled back to a previous version of the software; and
in response to receiving the rollback notification:
cause the software container to be an inactive container; and
cause the previously active container to be the active container.

11. The client device of claim 8, wherein the instructions further include instructions that cause the client device to:
retain a previously active container on the device for a minimum retention period; and
after the minimum retention period has passed, deprovision the previously active container.

12. The client device of claim 8, wherein the instructions further include instructions that cause the client device to, upon receiving a notification from the deployment service to deprovision the software container, cause the software container to be deprovisioned.

13. The client device of claim 8, wherein the deployment service communicates to the client device through a deployment agent running under a container encapsulation engine on the client device.

14. The client device of claim 8, wherein the software container is a first software container, the set of instructions are a first set of instructions, the set of tests are a first set of tests, and the instructions further include instructions that cause the client device to:
launch the at least the portion of the software package as a second set of instructions executing in a second software container;
perform a second set of tests on the executing second set of instructions in parallel with the first set of tests being performed on the executing first set of instructions, and provide results of the performed second set of tests to the deployment service; and
the notification from the deployment service to activate the first software container is based at least in part on the results of the performed first set of tests and the performed second set of tests.

15. The client device of claim 14, wherein the second set of tests are different from the first set of tests.

16. A non-transitory computer-readable storage medium having stored thereon executable instructions that, when executed by one or more processors of a computer system, cause the computer system to at least:
obtain a first software package and a second software package;
determine that a client device is ready to receive at least a portion of the first software package and at least a portion of the second software package;
provide at least the portion of the first software package and at least a portion of the second software package to the client device;
launch at least the provided portion of the first software package as set of instructions executing in a first test container;
launch at least the provided portion of the second software package as a second set of instructions executing in a second test container;
perform a first set of tests on the executing set of instructions in the first test container;
perform a second set of tests on the executing second set of instructions in parallel with the first set of tests being performed on the executing first set of instructions; and
determine, based at least in part on results of performing the first set of tests and the second set of tests, whether to cause an active container to be an inactive container, and cause the first test container to be an active container, and whether to cause at least the provided portion of the second software package to execute in the active container on the client device.

17. The non-transitory computer-readable storage medium of claim 16, wherein the test container is located at a testing framework and the executable instructions that cause the computer system to perform the set of tests on the executing set of instructions further cause the computer system to perform the set of tests on the executing set of instructions in the test container located at the testing framework.

18. The non-transitory computer-readable storage medium of claim 16, wherein the test container is a software container at the client device to which at least the portion of the software package is provided, and the executable instructions that cause the computer system to perform the set of tests on the executing set of instructions further cause the computer system to perform the set of tests on the executing set of instructions in the test container at the client device.

19. The non-transitory computer-readable storage medium of claim 16, wherein the executable instructions further cause the computer system to:

obtain, at a testing framework, the results of performing the set of tests; and the executable instructions that cause the computer system to determine whether to cause at least the provided portion of the software package to execute in the active container on the client device further cause the computer system to determine, based at least in part on the results of performing the set of tests, whether testing of the software package was successful.

20. The non-transitory computer-readable storage medium of claim 16, wherein the portion of the software package corresponds to a set of libraries that is not currently on the client device, or is currently on the client device but in a different version than in the software package.

21. The non-transitory computer-readable storage medium of claim 16, wherein the executable instructions further cause the computer system to:

store at least the portion of the software package in cache of one or more computing systems; and the executable instructions that cause the computer system to provide at least the portion of the software package to the client device cause the computer system to provide at least the portion of the software package from the cache to the client device.

22. The non-transitory computer-readable storage medium of claim 16, wherein the client device is a mobile telephone device, an electronic reading device, or a tablet computing device.

* * * * *